United States Patent
Omachi

(10) Patent No.: US 11,120,819 B2
(45) Date of Patent: Sep. 14, 2021

(54) VOICE EXTRACTION DEVICE, VOICE EXTRACTION METHOD, AND NON-TRANSITORY COMPUTER READABLE STORAGE MEDIUM

(71) Applicant: YAHOO JAPAN CORPORATION, Tokyo (JP)

(72) Inventor: Motoi Omachi, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 166 days.

(21) Appl. No.: 16/122,338

(22) Filed: Sep. 5, 2018

(65) Prior Publication Data

US 2019/0074030 A1  Mar. 7, 2019

(30) Foreign Application Priority Data

Sep. 7, 2017 (JP) ............................. JP2017-171820

(51) Int. Cl.
  *G10L 15/22* (2006.01)
  *G10L 25/18* (2013.01)
  (Continued)

(52) U.S. Cl.
  CPC .............. *G10L 25/78* (2013.01); *G10L 15/22* (2013.01); *G10L 25/18* (2013.01); *H04R 3/005* (2013.01);
  (Continued)

(58) Field of Classification Search
  CPC ......... G10L 25/78; G10L 15/22; G10L 25/18; G10L 21/0208; G10L 2021/02166;
  (Continued)

(56) References Cited

U.S. PATENT DOCUMENTS 3,856,992 A * 12/1974 Cooper ..................... H04S 3/02
  381/23
3,970,788 A * 7/1976 Cooper ..................... H04S 3/02
  381/5
(Continued)

FOREIGN PATENT DOCUMENTS

JP  2002-091469 A  3/2002
JP  2014-510481 A  4/2014

OTHER PUBLICATIONS

Dec. 12, 2017 Office Action issued in Japanese Patent Application No. 2017-171820.

*Primary Examiner* — Akwasi M Sarpong
(74) *Attorney, Agent, or Firm* — Oliff PLC

(57) ABSTRACT

A voice extraction device according to the present invention includes a formation unit, an acquisition unit, an emphasis unit, a generation unit, and a selection unit. The formation unit forms directivity through beam-forming processing for each microphone in a microphone array including a plurality of microphones that form a plurality of channels. The acquisition unit acquires an observation signal that is a signal of voice received by each of the channels. The emphasis unit generates an emphasized signal by emphasizing the observation signal in accordance with the directivity formed by the formation unit. The generation unit generates, for each channel, frequency distribution of amplitude of the emphasized signal generated by the emphasis unit. The selection unit selects a channel corresponding to a voice signal used for voice recognition from among the channels based on the frequency distribution corresponding to the respective channels generated by the generation unit.

9 Claims, 12 Drawing Sheets

(51) Int. Cl.
  *H04R 5/04* (2006.01)
  *H04R 3/00* (2006.01)
  *G10L 25/78* (2013.01)
  *G10L 21/0208* (2013.01)
  *G10L 21/0216* (2013.01)
  *H04R 1/40* (2006.01)

(52) U.S. Cl.
  CPC ...... *G10L 21/0208* (2013.01); *G10L 2021/02166* (2013.01); *H04R 1/406* (2013.01); *H04R 5/04* (2013.01); *H04R 2201/401* (2013.01); *H04R 2430/23* (2013.01)

(58) Field of Classification Search
  CPC ...... H04R 3/005; H04R 2430/23; H04R 5/04; H04R 2201/401; H04R 1/406
  USPC ............................ 704/225, 233, 226; 705/37
  See application file for complete search history.

(56) References Cited

U.S. PATENT DOCUMENTS

| | | | | |
|---|---|---|---|---|
| 4,236,039 | A * | 11/1980 | Cooper | H04S 3/02 381/23 |
| 4,682,248 | A * | 7/1987 | Schwartz | G01V 1/247 360/32 |
| 5,830,064 | A * | 11/1998 | Bradish | A63F 13/10 463/22 |
| 7,917,369 | B2 * | 3/2011 | Chen | G10L 19/002 704/500 |
| 8,160,273 | B2 * | 4/2012 | Visser | G10L 21/0272 381/94.7 |
| 8,682,675 | B2 * | 3/2014 | Togami | H04R 29/005 704/274 |
| 8,831,936 | B2 * | 9/2014 | Toman | G10L 21/0208 704/228 |
| 8,874,477 | B2 * | 10/2014 | Hoffberg | G06Q 10/103 705/37 |
| 9,202,455 | B2 * | 12/2015 | Park | G10K 11/17854 |
| 9,245,539 | B2 * | 1/2016 | Onishi | G10L 25/78 |
| 9,318,124 | B2 * | 4/2016 | Hiroe | G10L 21/0216 |
| 9,384,760 | B2 * | 7/2016 | Nakadai | G10L 25/78 |
| 9,491,007 | B2 * | 11/2016 | Black | H01Q 21/28 |
| 9,747,454 | B2 * | 8/2017 | Shigenaga | G08B 13/19686 |
| 10,482,899 | B2 * | 11/2019 | Ramprashad | G10L 21/0216 |
| 2002/0198762 | A1 * | 12/2002 | Donato | H04N 21/441 725/24 |
| 2004/0105557 | A1 * | 6/2004 | Matsuo | H04R 3/005 381/92 |
| 2004/0133500 | A1 * | 7/2004 | Thompson | G06Q 40/04 705/37 |
| 2005/0141735 | A1 * | 6/2005 | Kim | H04S 7/301 381/313 |
| 2006/0116073 | A1 * | 6/2006 | Richenstein | H04H 20/62 455/3.06 |
| 2006/0277035 | A1 * | 12/2006 | Hiroe | G10L 21/0272 704/203 |
| 2007/0233203 | A1 * | 10/2007 | Euliano | A61B 5/4356 607/46 |
| 2008/0208538 | A1 * | 8/2008 | Visser | G10L 21/0272 702/190 |
| 2008/0288219 | A1 * | 11/2008 | Tashev | H04B 7/0854 702/190 |
| 2009/0164212 | A1 * | 6/2009 | Chan | G10L 21/0208 704/226 |
| 2009/0299742 | A1 * | 12/2009 | Toman | G10L 21/0208 704/233 |
| 2010/0017205 | A1 * | 1/2010 | Visser | G10L 21/02 704/225 |
| 2010/0296665 | A1 * | 11/2010 | Ishikawa | G10L 21/0208 381/71.1 |
| 2011/0135101 | A1 * | 6/2011 | Matsuura | H04S 1/002 381/26 |
| 2012/0224715 | A1 * | 9/2012 | Kikkeri | H04R 3/005 381/92 |
| 2014/0177472 | A1 * | 6/2014 | Halasz | H04L 67/1091 370/255 |
| 2014/0185498 | A1 * | 7/2014 | Schwent | H04L 5/02 370/297 |
| 2014/0200887 | A1 * | 7/2014 | Nakadai | G10L 15/20 704/233 |
| 2014/0278394 | A1 * | 9/2014 | Bastyr | H04R 3/005 704/233 |
| 2015/0125011 | A1 * | 5/2015 | Sekiya | H04S 7/307 381/307 |
| 2015/0146885 | A1 * | 5/2015 | Fitzgerald | H04R 17/02 381/98 |
| 2016/0163303 | A1 * | 6/2016 | Benattar | G10K 11/17857 381/71.11 |
| 2016/0189728 | A1 * | 6/2016 | Chen | G10L 21/0208 704/246 |
| 2016/0261951 | A1 * | 9/2016 | Matheja | H03G 3/301 |
| 2017/0064478 | A1 * | 3/2017 | Lai | H04R 5/027 |
| 2018/0140233 | A1 * | 5/2018 | Lacirignola | A61B 5/125 |
| 2018/0343501 | A1 * | 11/2018 | Yu | G06F 16/7328 |
| 2019/0074030 | A1 * | 3/2019 | Omachi | H04R 3/005 |
| 2020/0410993 | A1 * | 12/2020 | Makinen | G10L 25/84 |

* cited by examiner

| MICROPHONE ID (CH) | KURTOSIS | SELECTION FLAG |
|---|---|---|
| 1 | 1.37 | 0 |
| 2 | 1.47 | 0 |
| 3 | 1.78 | 0 |
| 4 | 2.01 | 0 |
| 5 | 2.29 | 1 |
| 6 | 1.97 | 0 |
| 7 | 1.02 | 0 |
| 8 | -0.43 | 0 |

| SYSTEM | CORRECT CHARACTER ACCURACY |
|---|---|
| <1>channel_select(enh) | 63.99 |
| <2>channel_select(obs) | 61.53 |
| <3>Static(ONE MICROPHONE) | 57.77 |
| <4>BeamformIt | 55.06 |
| <5>BeamformIt(channel_select) | 55.00 |

FIG.15

|  | AVERAGE (sec.) | STANDARD DEVIATION (sec.) |
|---|---|---|
| BeamformIt | 14.18 | 1.60 |
| channel_select(obs) | 1.04 | 0.29 |

VOICE EXTRACTION DEVICE, VOICE EXTRACTION METHOD, AND NON-TRANSITORY COMPUTER READABLE STORAGE MEDIUM

CROSS-REFERENCE TO RELATED APPLICATION(S)

The present application claims priority to and incorporates by reference the entire contents of Japanese Patent Application No. 2017-171820 filed in Japan on Sep. 7, 2017.

BACKGROUND OF THE INVENTION

1. Field of the Invention

The present invention relates to a voice extraction device, a voice extraction method, and a non-transitory computer readable storage medium.

2. Description of the Related Art

In recent years, devices on which a voice user interface (UI) is mounted have been attracting worldwide attention. Such devices are assumed to be used in an environment in which a speaker is distant from the device. In such an environment, when influence of noise, reverberation, and the like is strong, performance of voice recognition is deteriorated. Thus, accuracy in voice recognition is important in such a device on which a voice UI is mounted and a system including the device, so that a robust configuration against noise, reverberation, and the like is required.

As such a device on which the voice UI is mounted, for example, developed is a device that performs sound source localization for estimating a direction of a speaker using a plurality of microphones, and performs beam-forming processing for emphasizing the voice coming from the direction of the speaker estimated through the sound source localization. Conventional technologies are described in Japanese Patent Application Laid-open No. 2002-091469 and Japanese Unexamined Patent Application Publication (Translation of PCT Application) No. 2014-510481, for example.

However, in the related art, if an error occurs in estimation of sound source localization, observed voice is distorted, and performance of voice recognition is deteriorated.

SUMMARY OF THE INVENTION

It is an object of the present invention to at least partially solve the problems in the conventional technology.

According to one aspect of an embodiment a voice extraction device includes a formation unit that forms directivity in advance through beam-forming processing for each microphone in a microphone array including a plurality of microphones that form a plurality of channels. The voice extraction device includes an emphasis unit that generates an emphasized signal by emphasizing the observation signal in each of the channels in accordance with the directivity for each of the microphones formed by the formation unit. The voice extraction device includes a generation unit that generates, for each of the channels, frequency distribution of amplitude of the emphasized signal generated by the emphasis unit. The voice extraction device includes a selection unit that selects a channel corresponding to a voice signal used for voice recognition from among the channels based on the frequency distribution corresponding to the respective channels generated by the generation unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 15 is a diagram illustrating an example of a result of processing time of extraction processing for processing time of each system.

DETAILED DESCRIPTION OF THE PREFERRED EMBODIMENTS

Figure 1:
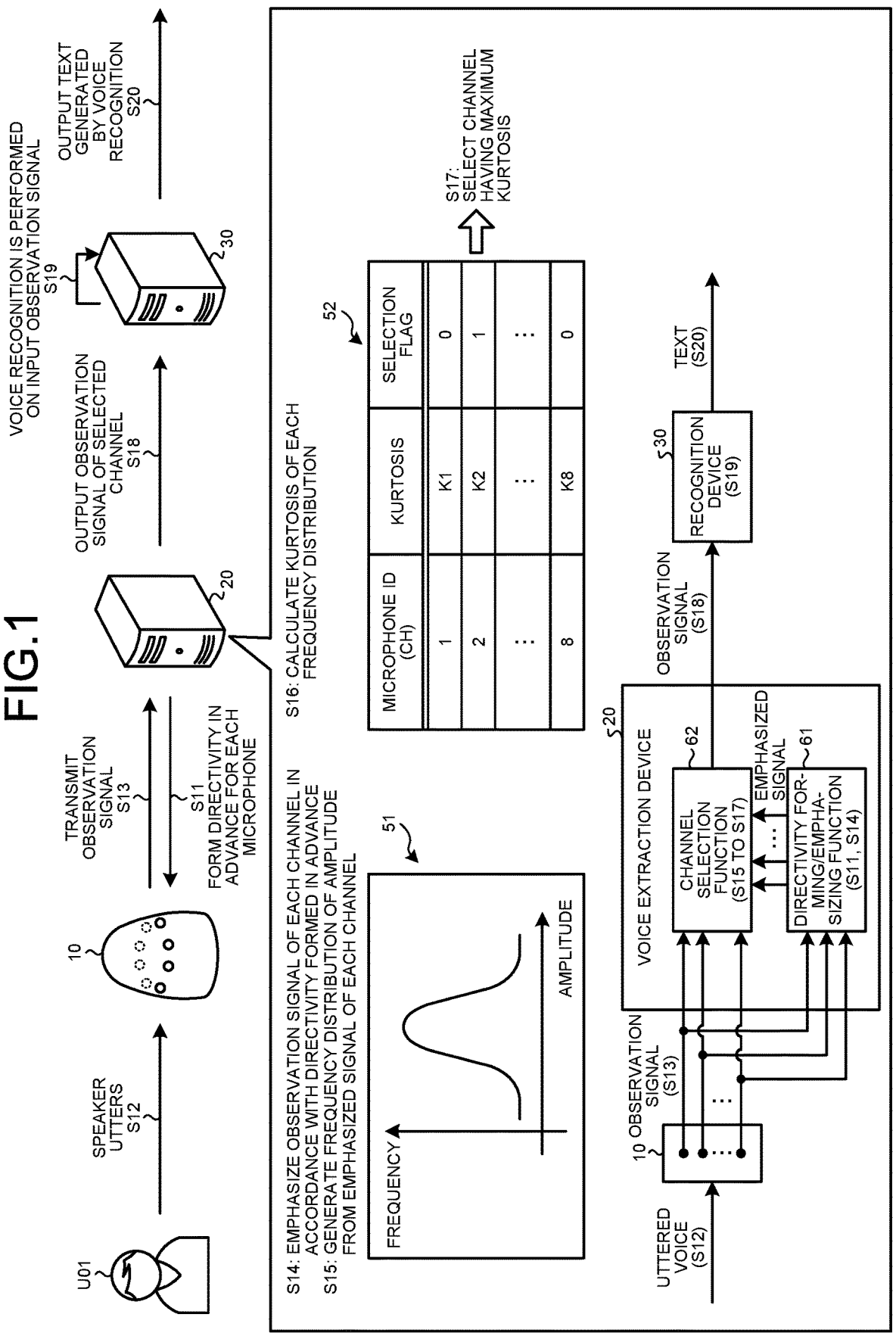
FIG. 1 is a diagram illustrating an example of extraction processing according to an embodiment.

The following describes a mode for carrying out a voice extraction device, a voice extraction method, and a voice extraction program according to the present invention (hereinafter, referred to as an "embodiment") in detail with reference to the drawings. The voice extraction device, the voice extraction method, and the voice extraction program according to the present invention are not limited to the embodiment. Embodiments can be appropriately combined without contradiction among pieces of processing content. The same parts are denoted by the same reference numeral in the following embodiments, and redundant description will not be repeated.

1. Extraction Processing

FIG. 1 is a diagram illustrating an example of extraction processing according to the embodiment. With reference to FIG. 1, the following describes an example of extraction processing according to the embodiment. FIG. 1 illustrates an example in which a voice extraction device 20 according to the present invention performs extraction processing on a voice signal (hereinafter, referred to as an "observation signal" in some cases) based on voice of a speaker received by a microphone array device 10, the extraction processing of emphasizing the observation signal of each channel in accordance with directivity formed in advance corresponding to each microphone of the microphone array device 10, selecting a channel based on a kurtosis of frequency distribution of amplitude of an emphasized signal, and outputting the observation signal corresponding to the selected channel. Herein, the channel indicates each sound receiving unit that receives voice of the speaker in the microphone array device 10, and specifically, corresponds to each microphone for which directivity is formed as described above.

As described above, a voice extraction device 20 illustrated in FIG. 1 is a device that performs extraction processing on the observation signal based on the voice received by the microphone array device 10, the extraction processing of emphasizing the observation signal of each channel in accordance with the directivity formed in advance corresponding to each microphone of the microphone array device 10, selecting a channel based on a kurtosis of frequency distribution of amplitude of the emphasized signal, and extracting the observation signal corresponding to the selected channel to be output. As illustrated in FIG. 1, the voice extraction device 20 has functions, that is, a directivity forming/emphasizing function 61, and a channel selection function 62.

The microphone array device 10 illustrated in FIG. 1 is a device that includes a plurality of microphones that receive voice from a surrounding environment, and transmits the voice received by each microphone to the voice extraction device 20 as an observation signal. For example, the microphones of the microphone array device 10 are arranged in a circular shape at regular intervals in a housing of a device main body as illustrated in FIG. 1.

In the example illustrated in FIG. 1, as the microphones included in the microphone array device 10, exemplified is eight microphones that are arranged in a circular shape at regular intervals, but the embodiment is not limited thereto. That is, for example, the microphones may be arranged in a rectangular shape, or may be stereoscopically arranged, not on the same plane.

The microphone array device 10 is not limited to be configured as a single device including a plurality of microphones, and may have a configuration in which a plurality of microphones are not integrated in one device but independently arranged, for example. For example, a plurality of microphones may be individually arranged alongside a wall of a room in which the speaker is present. However, a relative positional relation among the microphones needs to be determined in advance.

In the following example, the microphone array device 10 is assumed to include eight microphones.

A recognition device 30 illustrated in FIG. 1 is a server device that receives the observation signal output through the extraction processing performed by the voice extraction device 20, performs voice recognition processing on the observation signal, and converts the observation signal into text represented by the observation signal to be output.

Figure 2:
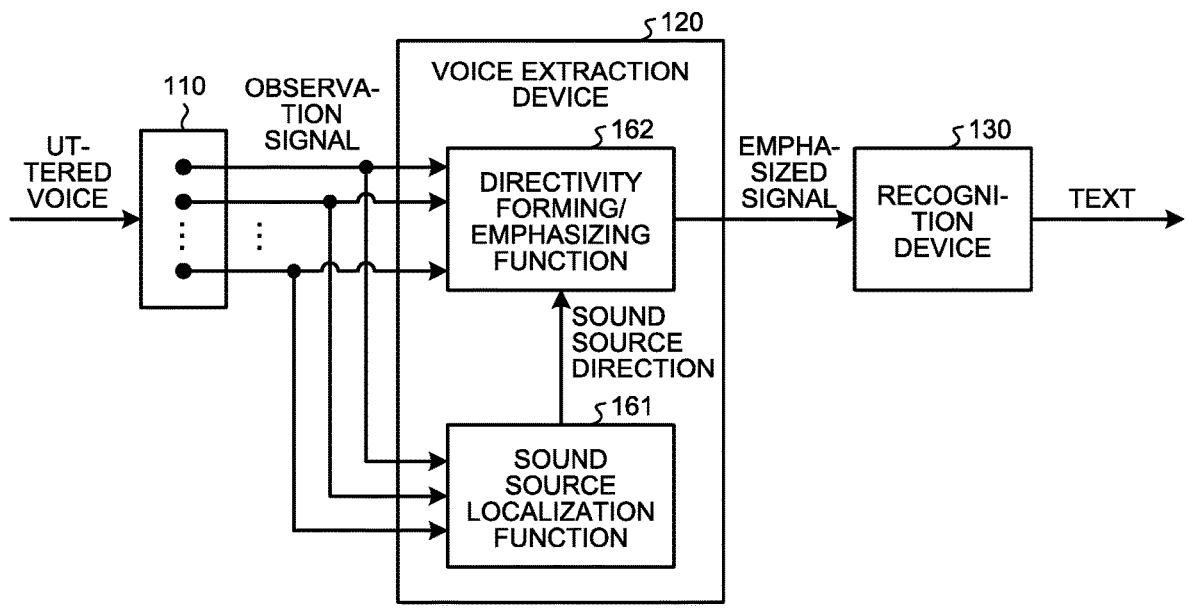
FIG. 2 is a diagram illustrating an example of a voice recognition system in the related art.

FIG. 2 is a diagram illustrating an example of the voice recognition system in the related art. Herein, with reference to FIG. 2, the following describes an outline of processing performed by the voice recognition system in the related art. As illustrated in FIG. 2, the voice recognition system in the related art illustrated as an example includes a microphone array device 110, a voice extraction device 120, and a recognition device 130, for example.

The microphone array device 110 has the same function as that of the microphone array device 10 according to the present embodiment described above, includes a plurality of microphones that receive voice from the surrounding environment, and transmits the voice received by each microphone to the voice extraction device 120 as the observation signal.

The voice extraction device 120 is a device that estimates a direction of a sound source through sound source localization from the observation signal based on the voice received by each microphone of the microphone array device 110, forms directivity with respect to the estimated direction through beam-forming processing, and emphasizes the observation signal to generate (extract) an emphasized signal based on the formed directivity. As illustrated in FIG. 2, the voice extraction device 120 has functions, that is, a sound source localization function 161 and a directivity forming/emphasizing function 162.

The sound source localization function 161 is a function of estimating a direction of a sound source through sound source localization from the observation signal based on the voice received by each microphone of the microphone array device 110. Examples of a method of sound source localization include a multiple signal classification (MUSIC) method, and a generalized cross-correlation with phase transform (GCC-PHAT) method. The MUSIC method is a method of estimating a sound source direction using a space correlation matrix of noise and an array manifold vector recorded in advance. The GCC-PHAT is a method of estimating the sound source direction by calculating a cross-correlation function between observation signals in each microphone in a frequency region. In view of a load of arithmetic operation, the MUSIC method needs to develop an eigenvalue in the space correlation matrix, so that the GCC-PHAT can further reduce a processing load of arithmetic operation as compared with the MUSIC method.

The directivity forming/emphasizing function 162 is a function of forming directivity through beam-forming processing for the sound source (speaker) estimated by the sound source localization function 161, and emphasizing the observation signal to generate the emphasized signal based on the formed directivity. Examples of the beam-forming processing include a delay-and-sum (DS) method, and a minimum variance distortionless response (MVDR). The MVDR is a method of suppressing noise from the surrounding environment under restriction that distortion is small with respect to a direction in which directivity is formed, and is known to be effective for voice recognition if the sound source direction can be correctly estimated. However, an inverse matrix of the space correlation matrix of noise needs to be estimated, so that an arithmetic amount in the MVDR is large. On the other hand, it is not necessary to estimate the space correlation matrix in the DS method, so that the DS method is superior to the MVDR in view of the arithmetic amount. Accordingly, the DS method is preferably employed to reduce a processing load of an arithmetic operation.

The recognition device 130 is a server device that receives the emphasized signal extracted and output by the voice extraction device 120, performs voice recognition processing on the emphasized signal, and converts the emphasized signal into text represented by the observation signal to be output. Examples of the voice recognition processing include a recognition algorithm using a deep neural network or a hidden Markov model.

In the voice recognition system in the related art as described above, every time the observation signal is received from the microphone array device 110, the direction of the sound source (speaker) needs to be estimated by performing sound source localization and the directivity needs to be formed in the direction through beam-forming processing, so that there is a problem in which the load of arithmetic processing is large. Additionally, if an error occurs in estimation of sound source localization, the emphasized signal that is emphasized based on the observation signal is distorted, and performance of voice recognition is deteriorated.

A voice recognition system 1 according to the present embodiment is assumed to form directivity in advance so as to emphasize the voice coming from a direction facing each microphone of the microphone array device 10 by performing the processing described below (specifically, extraction processing performed by the voice extraction device 20), emphasize the observation signal of each channel in accordance with the directivity, select the channel based on the kurtosis of the frequency distribution of amplitude of the emphasized signal, and extract the observation signal corresponding to the selected channel. Due to this, the directivity is not necessarily formed every time the observation signal is received, and the channel is selected based on the frequency distribution (specifically, the kurtosis calculated from the distribution) of the amplitude generated with the emphasized signal of each channel emphasized based on the formed directivity, not by estimating the sound source direction through sound source localization performed by the voice recognition system in the related art as described above. This channel selection corresponds to the function of sound source localization of the voice recognition system in the related art, but it is not necessary to perform the sound source localization processing the calculation load of which is high as described above. Accordingly, as compared with the voice recognition system in the related art, the load of arithmetic processing can be reduced, and the signal can be prevented from being distorted by appropriately extracting the voice, so that accuracy in voice recognition can be improved. Returning to FIG. 1, the following describes an example of processing performed by the voice recognition system 1 according to the present embodiment (specifically, extraction processing performed by the voice extraction device 20) in accordance with a procedure.

The voice extraction device 20 forms directivity in advance so as to emphasize the voice coming from the direction facing each microphone of the microphone array device 10 (Step S11). Specific content of formation of the directivity will be described later with reference to FIG. 4.

In this way, in a state in which the directivity is formed in advance with respect to the direction facing each microphone (each channel) of the microphone array device 10, a speaker U01 utters to the microphone array device 10 (Step S12). The microphone array device 10 transmits the voice received by each microphone to the voice extraction device 20 as the observation signal (Step S13).

When receiving the observation signal from the microphone array device 10, the voice extraction device 20 emphasizes, as the directivity forming/emphasizing function 61, the observation signal of each channel to generate the emphasized signal in accordance with the directivity formed in advance (Step S14). As the channel selection function 62, the voice extraction device 20 generates frequency distribution (for example, frequency distribution 51 illustrated in FIG. 1) of amplitude of the emphasized signal for each channel based on the emphasized signal of each channel (Step S15). As the channel selection function 62, the voice extraction device 20 calculates the kurtosis of the frequency distribution of amplitude of an emphasized signal of each generated channel (Step S16). At this point, as illustrated in FIG. 1 as calculation result information 52, the voice extraction device 20 stores the calculated kurtosis of each channel in association with a microphone ID of each microphone of the microphone array device 10.

As the channel selection function 62, the voice extraction device 20 selects the channel for outputting the observation signal to the recognition device 30 based on the calculated kurtosis of each channel (Step S17). Specifically, the voice extraction device 20 selects the channel corresponding to the maximum kurtosis among kurtosises of respective channels. At this point, as illustrated in FIG. 1 as the calculation result information 52, the voice extraction device 20 stores a selection flag in association with the microphone ID of the microphone of the microphone array device 10. The voice extraction device 20 extracts the observation signal corresponding to the channel selected at Step S17 from among observation signals of the voice received by the respective microphones of the microphone array device 10, and outputs the observation signal to the recognition device 30 (Step S18).

The recognition device 30 performs voice recognition processing on the observation signal received (input) from the voice extraction device 20, and converts the observation signal into text (Step S19). The recognition device 30 then outputs the text converted (generated) from the observation signal to an external device that utilizes the text (Step S20).

Through the processing performed by the voice recognition system 1 as described above, the directivity is not necessarily formed every time the observation signal is received, and the channel is selected based on the frequency distribution (specifically, the kurtosis calculated from the distribution) of amplitude generated with the emphasized signal of each channel emphasized based on the formed directivity, not by estimating the sound source direction through sound source localization performed by the voice recognition system in the related art as described above. Accordingly, as compared with the voice recognition system in the related art, a load of arithmetic processing can be reduced, and the signal can be prevented from being distorted by appropriately extracting the voice, so that accuracy in voice recognition can be improved.

The following describes the voice extraction device 20 that performs such processing, the configuration of the voice recognition system 1 including the voice extraction device 20, and the like in detail.

2. Configuration of Voice Recognition System

Figure 3:
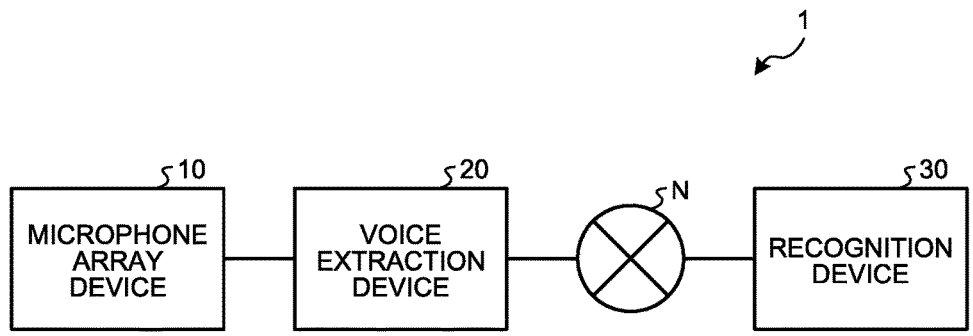
FIG. 3 is a diagram illustrating a configuration example of a voice recognition system according to the embodiment.

FIG. 3 is a diagram illustrating a configuration example of the voice recognition system according to the embodiment. With reference to FIG. 3, the following describes the configuration of the voice recognition system 1 according to the present embodiment.

As illustrated in FIG. 3, the voice recognition system 1 according to the present embodiment includes the microphone array device 10, the voice extraction device 20, and the recognition device 30. The microphone array device 10 is connected to the voice extraction device 20, and transmits the received voice signal to the voice extraction device 20. The voice extraction device 20 is communicably connected to the recognition device 30 in a wired or wireless manner via a network N.

The voice recognition system 1 illustrated in FIG. 3 includes one microphone array device 10 and one voice extraction device 20, but the embodiment is not limited thereto. The voice recognition system 1 may include a plurality of microphone array devices 10 and a plurality of voice extraction devices 20. A plurality of microphone array devices 10 may be connected to the voice extraction device 20. FIG. 3 illustrates an example in which the microphone array device 10 is directly connected to the voice extraction device 20, but the embodiment is not limited thereto. The microphone array device 10 may be communicably connected to the voice extraction device 20 in a wireless manner, or may be communicably connected to the voice extraction device 20 via a wired or wireless network.

The microphone array device 10 is a device that includes a plurality of microphones for receiving voice from the surrounding environment, and transmits the voice received by each microphone to the voice extraction device 20 as the observation signal. As illustrated in FIG. 1, for example, the microphones of the microphone array device 10 are arranged in a circular shape at regular intervals.

The voice extraction device 20 is a device that performs the extraction processing described above based on the observation signal based on the voice received by each microphone of the microphone array device 10. The voice extraction device 20 is, for example, implemented by a computer such as a personal computer (PC), a workstation, or a dedicated device.

The recognition device 30 is a server device that receives the observation signal output through the extraction processing performed by the voice extraction device 20, performs voice recognition processing on the observation signal, and converts the observation signal into text represented by the observation signal to be output. The recognition device 30 is, for example, implemented by a computer such as a PC or a workstation.

In FIG. 3, the microphone array device 10, the voice extraction device 20, and the recognition device 30 are independent of each other. Alternatively, for example, the microphone array device 10 and the voice extraction device 20 may be integrated to be one device, the voice extraction device 20 and the recognition device 30 may be integrated to be one device, or all of the microphone array device 10, the voice extraction device 20, and the recognition device 30 may be integrated to be one device.

3. Configuration of Voice Extraction Device

Figure 4:
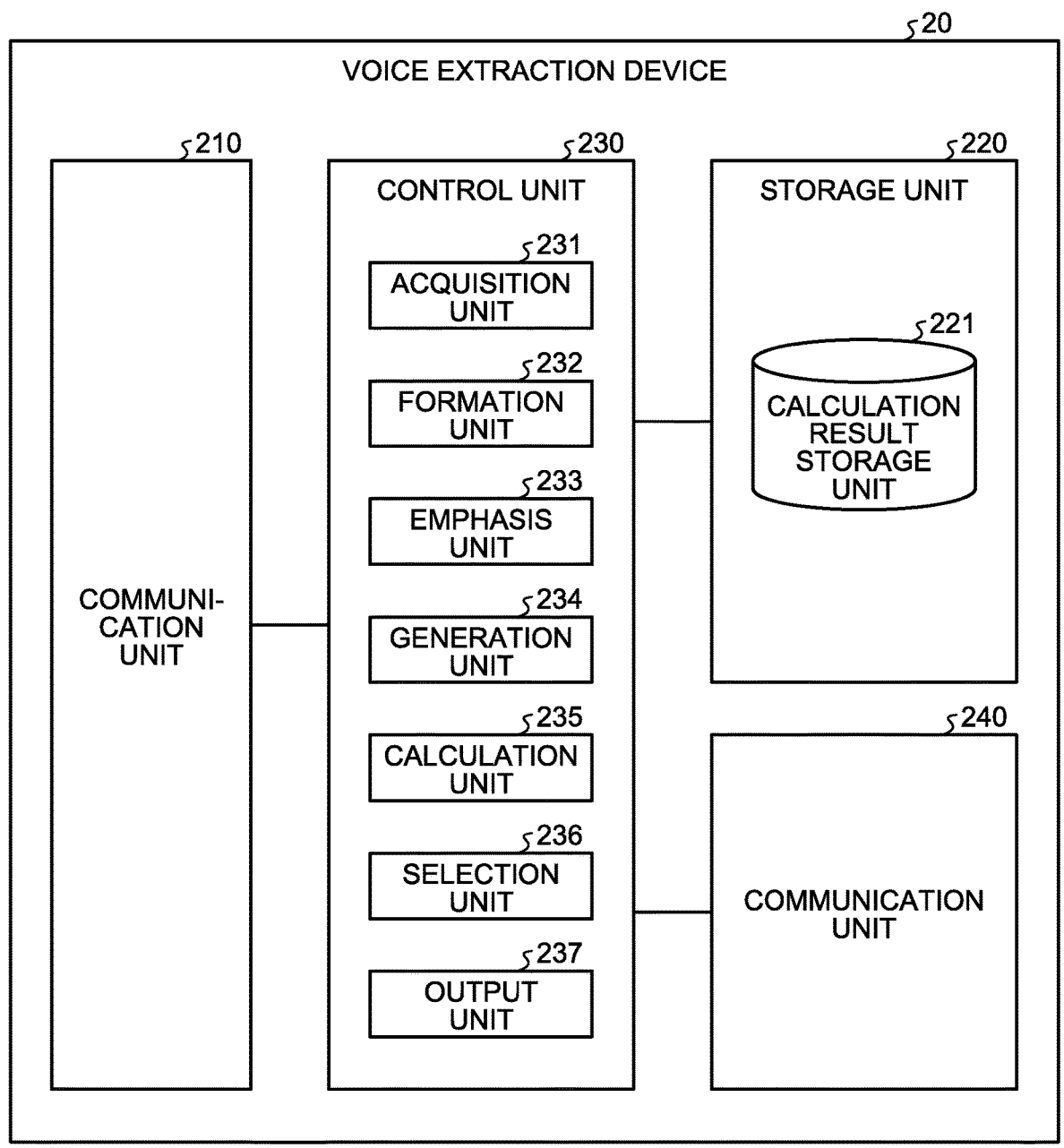
FIG. 4 is a diagram illustrating a configuration example of a voice extraction device according to the embodiment.

FIG. 4 is a diagram illustrating a configuration example of the voice extraction device according to the embodiment. With reference to FIG. 4, the following describes the configuration of the voice extraction device 20 according to the present embodiment.

As illustrated in FIG. 4, the voice extraction device 20 according to the present embodiment includes a communication unit 210, a storage unit 220, a control unit 230, and a communication unit 240. The voice extraction device 20 may include an input unit (for example, a mouse or a keyboard) that receives various operations from an administrator and the like utilizing the voice extraction device 20, or a display unit (for example, a liquid crystal display or an organic electro-luminescence (EL) display) that displays various pieces of information.

Regarding Communication Unit 210

The communication unit 210 is a functional part that communicates information with the microphone array device 10. Specifically, the communication unit 210 receives, for example, the voice of the speaker received by the microphone array device 10 as the voice signal (observation signal). The communication unit 210 is implemented by a communication I/F 1600 (for example, a universal serial bus (USB) interface) illustrated in FIG. 13 described later.

Regarding Storage Unit 220

Figures 13, 14:
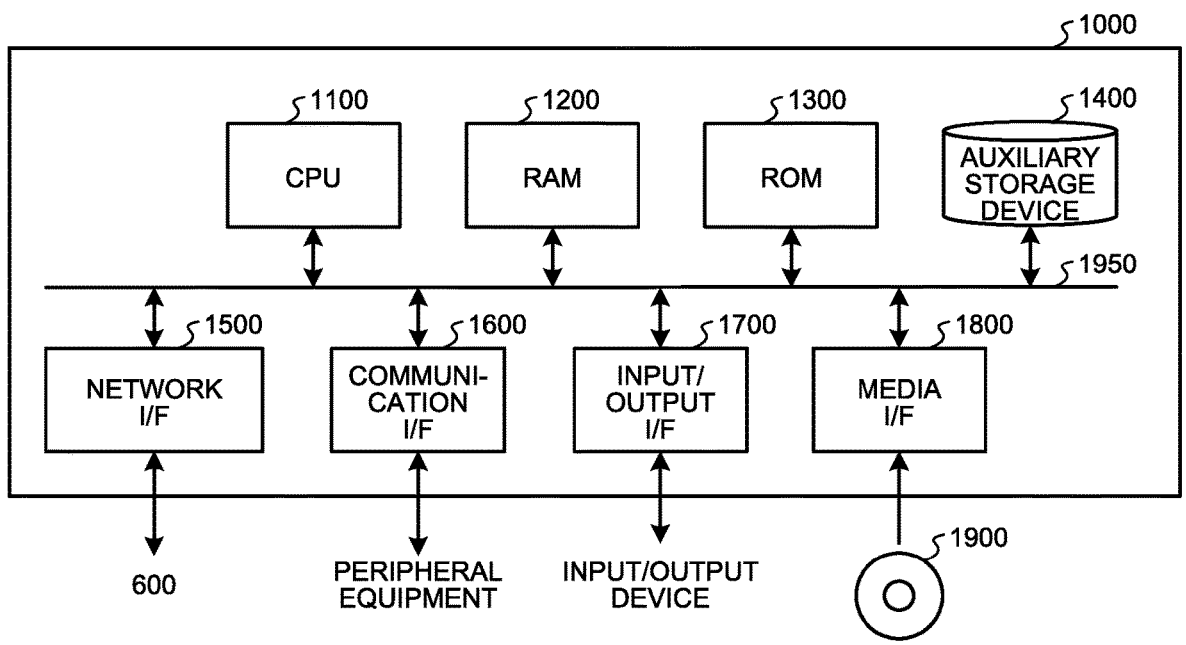
FIG. 13 is a diagram illustrating an example of a hardware configuration of a computer that implements a function of the voice extraction device.
FIG. 14 is a diagram illustrating an example of a verification result of correct character accuracy in each system.

The storage unit 220 is a functional part that stores various pieces of information provided for processing performed by the voice extraction device 20. The storage unit 220 stores, for example, a parameter for determining the directivity formed by a formation unit 232 of the control unit 230 described later, information of the frequency distribution of amplitude of the emphasized signal generated by a generation unit 234, and the kurtosis of the frequency distribution calculated by a calculation unit 235. As illustrated in FIG. 4, the storage unit 220 includes a calculation result storage unit 221. The storage unit 220 is implemented by at least one of a random access memory (RAM) 1200, an auxiliary storage device 1400 (a hard disk drive (HDD), a solid state drive (SSD), or the like), and a recording medium 1900 (a digital versatile disc rewritable (DVD-RW) and the like) that are illustrated in FIG. 13 described later.

Regarding Calculation Result Storage Unit 221

The calculation result storage unit 221 stores the kurtosis of the frequency distribution and the like calculated by the calculation unit 235 described later.

Figures 5, 6:
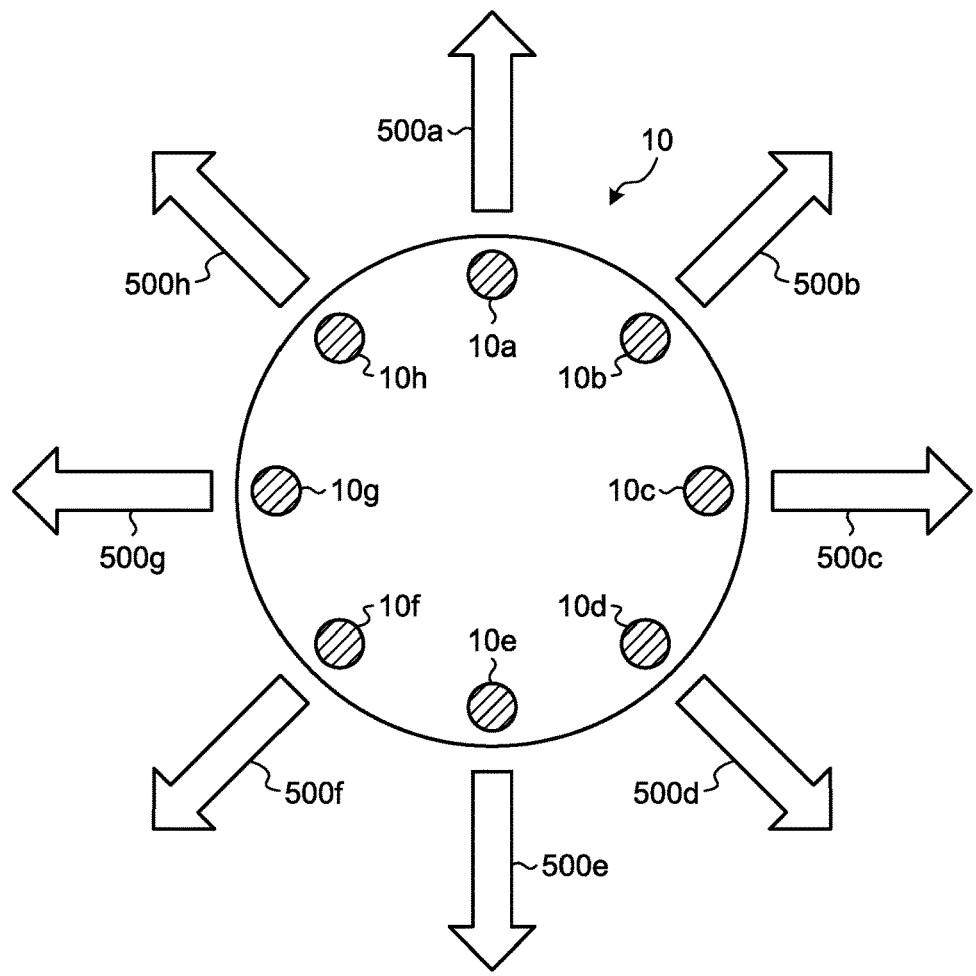
FIG. 5 is a diagram illustrating an example of a calculation result storage unit according to the embodiment.
FIG. 6 is a diagram for explaining directivity of a microphone array device according to the embodiment.

FIG. 5 is a diagram illustrating an example of the calculation result storage unit according to the embodiment. With reference to FIG. 5, the following describes an example of the calculation result storage unit 221 according to the present embodiment. In the example of the calculation result storage unit 221 illustrated in FIG. 5, the calculation result storage unit 221 stores the "microphone ID (CH)", the "kurtosis", and the "selection flag" in association with each other.

The "microphone ID (CH)" is information for identifying each microphone (that is, each channel) of the microphone array device 10. As described above, when the microphone array device 10 includes eight microphones, for example, pieces of identification information of "1" to "8" are assigned to the respective microphones (respective channels) as illustrated in FIG. 5.

The "kurtosis" is a value indicating a kurtosis for the frequency distribution of amplitude of the emphasized signal that is emphasized in accordance with the directivity formed for a corresponding channel. A method of calculating the "kurtosis" will be described later with reference to FIG. 8.

The "selection flag" is flag information indicating that which channel is selected by a selection unit 236 of the control unit 230 described later. In the example illustrated in FIG. 5, "1" indicates that the corresponding channel is selected, and "0" indicates that the corresponding channel is not selected. That is, as described later, the selection unit 236 selects the channel having the maximum kurtosis, so that it is indicated that the channel "5" having the maximum kurtosis (illustrated in FIG. 8) of "2.29" is selected.

That is, the example of the calculation result storage unit 221 illustrated in FIG. 5 indicates, regarding the microphone ID (CH) "5", that the kurtosis is "2.29" and the selection flag is "1".

The configuration of the calculation result storage unit 221 illustrated in FIG. 5 is merely an example, and other pieces of information may be included therein. For example, the calculation result storage unit 221 may store information and the like about a date and time at which the channel is selected by the selection unit 236 in association with the pieces of information described above.

The calculation result storage unit 221 illustrated in FIG. 5 is information in a table format, but the embodiment is not limited thereto. The calculation result storage unit 221 may be information in any format so long as values in respective fields in the table can be associated with each other to be managed.

Regarding Control Unit 230

The control unit 230 is a functional part that controls an operation of the entire voice extraction device 20. As illustrated in FIG. 4, the control unit 230 includes an acquisition unit 231, the formation unit 232, an emphasis unit 233, the generation unit 234, the calculation unit 235, the selection unit 236, and an output unit 237. The control unit 230 is implemented when a central processing unit (CPU) 1100 illustrated in FIG. 13 described later executes a computer program stored in a read only memory (ROM) 1300, the auxiliary storage device 1400, and the like using the RAM 1200 as a working area.

Part or all of the functional parts described above of the control unit 230 are not necessarily implemented by a computer program as software, but may be implemented by a hardware circuit such as a field-programmable gate array (FPGA) or an application specific integrated circuit (ASIC).

Each functional part of the control unit 230 illustrated in FIG. 4 conceptually represents a function, and is not limited to the configuration as described above. For example, a plurality of functional parts illustrated in FIG. 4 as independent functional parts of the control unit 230 may be configured as one functional part. On the other hand, a function of one functional part included in the control unit 230 in FIG. 4 may be divided into a plurality of functions, and may be configured as a plurality of functional parts.

Regarding Acquisition Unit 231

The acquisition unit 231 is a functional part that acquires, as the observation signal, the voice received by each microphone (each channel) of the microphone array device 10 via the communication unit 210. The acquisition unit 231 transmits the acquired observation signal of each microphone to the emphasis unit 233.

Regarding Formation Unit 232

The formation unit 232 is a functional part that forms directivity so as to emphasize the voice coming from the direction facing each microphone of the microphone array device 10. As the first processing of the extraction processing performed by the voice extraction device 20, the formation unit 232 forms directivity corresponding to each microphone in advance. The function of the formation unit 232 is included in the directivity forming/emphasizing function 61 illustrated in FIG. 1 described above.

Herein, formation of directivity indicates processing (beam-forming processing) of determining a parameter for emphasizing the voice coming from the direction facing each microphone. Specifically, to emphasize the voice coming from the direction facing a specific microphone, for example, performed is processing of adding an optional delay to each of the observation signals of the voice received by the microphones, and assigning weights (for example, causing weight of the observation signal of the voice received by the specific microphone to be the maximum, and causing weight of the observation signal of the voice received by a microphone arranged at a position most distant from the specific microphone to be the minimum) thereto, and performing addition. In this way, formation of directivity means the processing of determining a specific value using, as a parameter, the weight for each observation signal used in the processing of emphasizing the voice coming from the direction facing a specific microphone. As described later, the emphasis unit 233 is a functional part that emphasizes the voice coming from the direction facing a specific microphone using the parameter determined by forming the directivity.

The beam-forming processing of forming the directivity may be performed by using a known method such as the DS method or MVDR described above. However, to reduce a processing load of arithmetic operation, the DS method is preferably used.

FIG. 6 is a diagram for explaining directivity of the microphone array device according to the embodiment. With reference to FIG. 6, the following describes formation of directivity by the formation unit 232 according to the present embodiment.

The microphone array device 10 according to the present embodiment includes microphones 10a to 10h as a plurality of microphones as illustrated in FIG. 6. For example, the formation unit 232 performs processing of determining a parameter for emphasizing the voice coming from a directivity forming direction 500a that is a direction facing the microphone 10a of the microphone array device 10. Similarly, the formation unit 232 performs processing of determining a parameter for emphasizing the voice coming from directivity forming directions 500b to 500h that are directions facing the respective microphones 10b to 10h.

Regarding Emphasis Unit 233

The emphasis unit 233 is a functional part that emphasizes the observation signal of each channel to generate the emphasized signal in accordance with the directivity formed by the formation unit 232. Specifically, in a case of emphasizing the voice facing a specific microphone (channel), the emphasis unit 233 performs weighting and addition on the observation signal of the voice received by each channel using the parameter determined by the formation unit 232 to emphasize the voice facing the specific microphone. Hereinafter, emphasizing the voice facing the microphone of the specific channel using the observation signal of the voice received by each channel and the parameter corresponding to the directivity of the specific channel determined by the formation unit 232 may be simply referred to as "enhancing the observation signal of the specific channel". The emphasis unit 233 transmits the generated emphasized signal of each channel to the generation unit 234. The function of the emphasis unit 233 is included in the directivity forming/emphasizing function 61 illustrated in FIG. 1 described above.

Regarding Generation Unit 234

The generation unit 234 is a functional part that generates frequency distribution of amplitude of the emphasized signal for each channel based on the emphasized signal of each channel emphasized by the emphasis unit 233. The generation unit 234 causes the storage unit 220 to store information of the frequency distribution of amplitude of the emphasized signal generated for each channel. The function of the generation unit 234 is included in the channel selection function 62 illustrated in FIG. 1 described above.

Figure 7A:
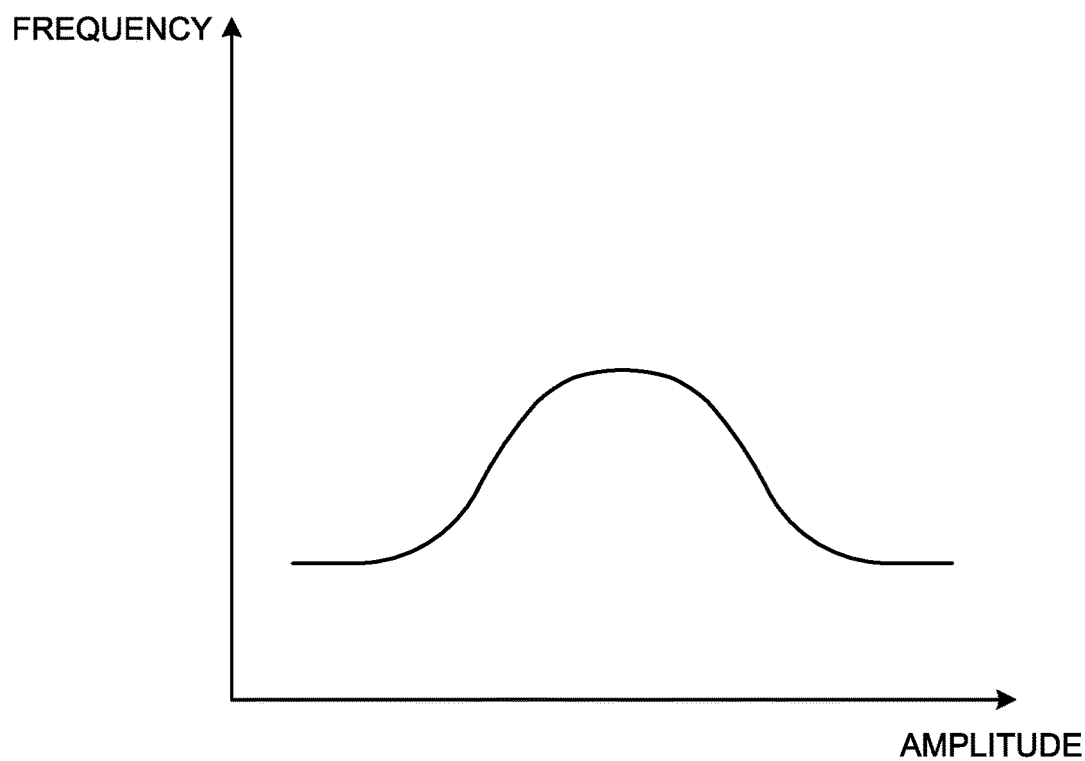
FIGS. 7A and 7B are diagrams illustrating an example of frequency distribution of amplitude of an emphasized signal according to the embodiment.
Figure 7B:
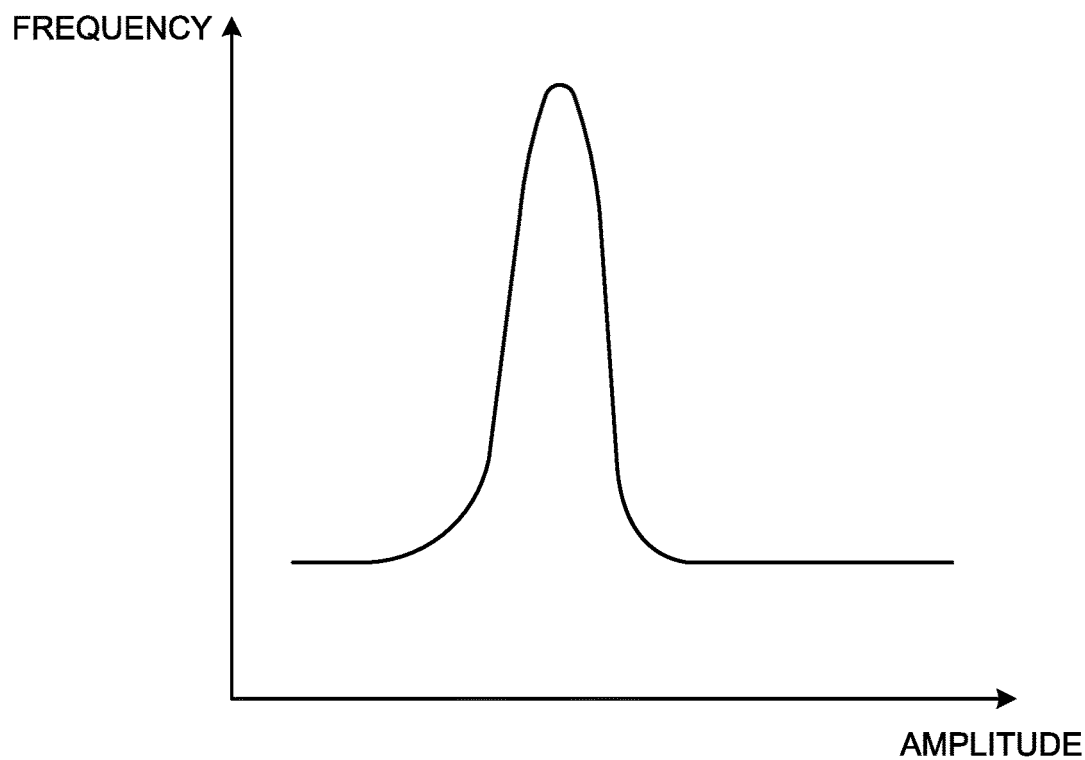

FIGS. 7A and 7B are diagrams illustrating an example of frequency distribution of amplitude of the emphasized signal according to the embodiment. With reference to FIGS. 7A and 7B, the following describes frequency distribution of amplitude generated by the generation unit 234.

The emphasized signal generated by the emphasis unit 233, which is the voice signal, includes signals of various frequency components. The graph in FIGS. 7A and 7B illustrates distribution generated by counting frequency about how many signals of what type of amplitude are included at each of timings at regular intervals within predetermined time in each frequency bin, for example. Thus, the generation unit 234 generates frequency distribution (histogram) of amplitude of the emphasized signal illustrated in FIGS. 7A and 7B for each frequency bin. The generation unit 234 then transmits, to the calculation unit 235, the information of the generated frequency distribution of amplitude of the emphasized signal of each channel.

Regarding Calculation Unit 235

The calculation unit 235 is a functional part that calculates the kurtosis of the frequency distribution of amplitude of the emphasized signal of each channel generated by the generation unit 234. Herein, the kurtosis is a value indicating sharpness of a distribution shape of a peak portion of the frequency distribution of amplitude (for example, frequency distribution illustrated in FIGS. 7A and 7B) and a vicinity portion thereof.

For example, in the frequency distribution illustrated in FIG. 7B, the peak portion and the vicinity portion thereof are sharp, and the peak portion is positioned to be higher than the bottom portion. In the frequency distribution illustrated in FIG. 7A, the peak portion and the vicinity portion thereof have a round shape, and the peak portion is not higher than the bottom portion. In this case, the kurtosis calculated for the frequency distribution in FIG. 7B has a higher value than that of the kurtosis calculated for the frequency distribution in FIG. 7A.

Figure 8:
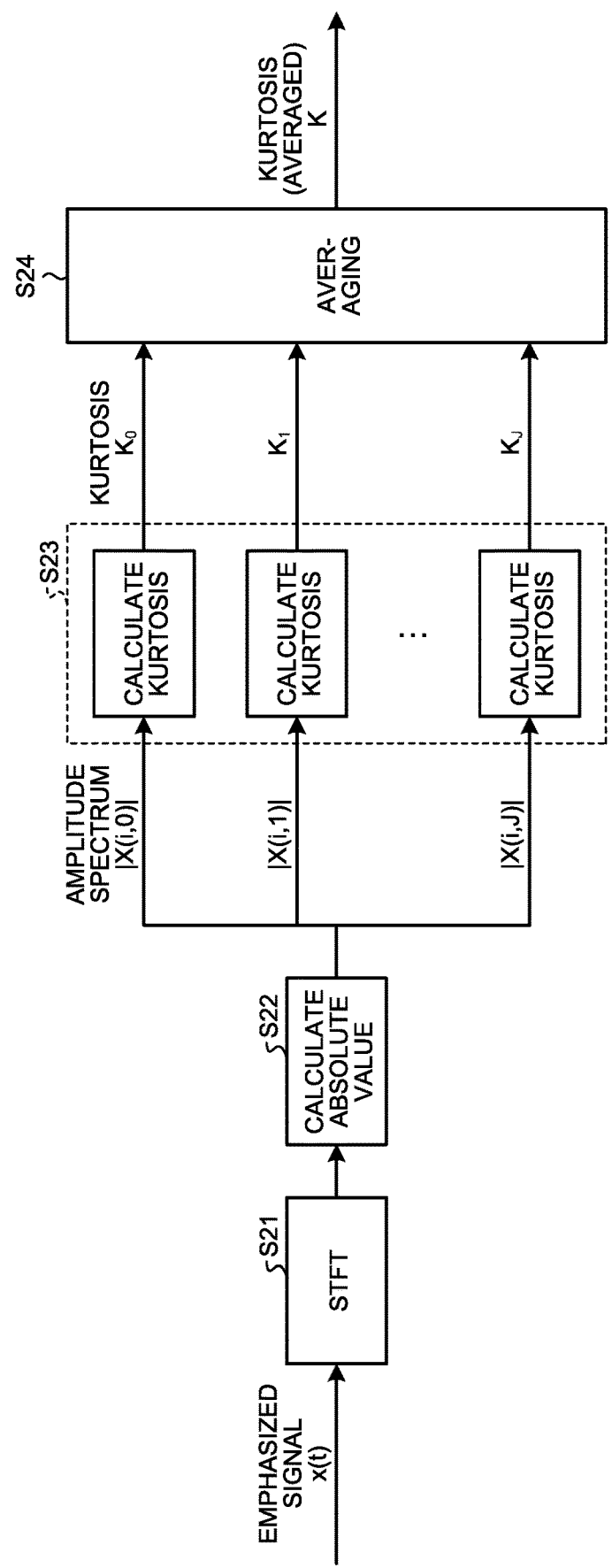
FIG. 8 is a diagram illustrating an example of a method of calculating a kurtosis of frequency distribution of amplitude according to the embodiment.

FIG. 8 is a diagram illustrating an example of a method of calculating the kurtosis of the frequency distribution of amplitude according to the embodiment. With reference to FIG. 8, the following describes an example of the method of calculating the kurtosis of the frequency distribution of amplitude by the calculation unit 235.

First, the generation unit 234 performs Short-Time Fourier Transform (STFT) on the emphasized signal generated by the emphasis unit 233 (Step S21). Accordingly, a frequency component is extracted from the emphasized signal. In the example illustrated in FIG. 8, components of J frequency bins are assumed to be extracted. The generation unit 234 takes an absolute value of the component for each frequency bin obtained through STFT to obtain an amplitude spectrum |X(i, 0)|, |X(i, 1)|, . . . , |X(i, J)| (Step S22). The generation unit 234 generates the frequency distribution of amplitude described above from the amplitude spectrum for each frequency bin.

Next, the calculation unit 235 calculates the kurtosis for each frequency bin from the frequency distribution of amplitude based on the amplitude spectrum (Step S23). The calculation unit 235 calculates the kurtosis for each frequency bin by the following expression (1), for example.

Expression 1

$$K_j = \frac{M[|X(i, j)|^4] - 3M[|X(i, j)|^2]^2}{M[|X(i, j)|^2]^2} - 3 \quad (1)$$

In the expression (1), $K_j$ represents the kurtosis corresponding to the j-th frequency bin, |X(i, j)| represents the amplitude spectrum in the i-th frame, and $M[x^n]$ represents an n-th order moment. A moment $M[x^n]$ is defined by the following expression (2).

Expression 2

$$M[x^n] = \int_{-\infty}^{\infty} x^n p(x) dx \quad (2)$$

In the expression (2), p(x) represents a probability density function corresponding to distribution of a variable x.

The calculation unit 235 then calculates an average value (K) of the kurtosises calculated for each frequency bin by the following expression (3) (Step S24), and causes the average value to be the kurtosis of the frequency distribution of amplitude corresponding to the channel of interest.

Expression 3

$$K = \frac{1}{J} \sum_{j=1}^{J} K_j$$

The calculation unit 235 performs calculation processing at Steps S21 to S24 described above for each channel. The calculation unit 235 causes the calculation result storage unit 221 to store the calculated kurtosis corresponding to each channel. Specifically, as illustrated in FIG. 5, the calculation unit 235 causes the calculation result storage unit 221 to store the calculated kurtosis of each channel in association with the microphone ID of each microphone of the microphone array device 10. The function of the calculation unit 235 is included in the channel selection function 62 illustrated in FIG. 1 described above.

Regarding Selection Unit 236

The selection unit 236 is a functional part that selects the channel for outputting the observation signal to the recognition device 30 based on the kurtosis of each channel calculated by the calculation unit 235. Specifically, the selection unit 236 selects the channel corresponding to the maximum kurtosis among the kurtosises of the respective channels. As illustrated in FIG. 5, the selection unit 236 causes the calculation result storage unit 221 to store the selection flag in association with the microphone ID of the microphone of the microphone array device 10. The function of the selection unit 236 is included in the channel selection function 62 illustrated in FIG. 1 described above.

The reason for utilizing the kurtosis to select the channel for outputting the observation signal is as follows. Distribution of the voice signal follows distribution such as Laplace distribution, but distribution of a voice signal in which a plurality of noise sources are mixed has a property of being close to normal distribution. That is, the reason is that the kurtosis of the frequency distribution of amplitude of the voice signal (herein, the emphasized signal) in a case in which the voice corresponding to each channel is present, that is, the kurtosis, is estimated to be higher than the kurtosis of the frequency distribution in a case in which the voice is not present.

Regarding Output Unit 237

The output unit 237 is a functional part that extracts the observation signal corresponding to the channel selected by the selection unit 236 from among the observation signals of the voice received by the microphones of the microphone array device 10, and outputs the observation signal to the recognition device 30 via the communication unit 240. The function of the output unit 237 is included in the channel selection function 62 illustrated in FIG. 1 described above.

Regarding Communication Unit 240

The communication unit 240 is a functional part that communicates information with the recognition device 30. Specifically, for example, the communication unit 240 transmits the observation signal corresponding to the channel selected by the selection unit 236 to the recognition device 30 via the network N using the function of the output unit 237. The communication unit 240 is implemented by a network I/F 1500 (for example, a network interface card (NIC)) illustrated in FIG. 13 described later.

4. Configuration of Recognition Device

Figure 9:
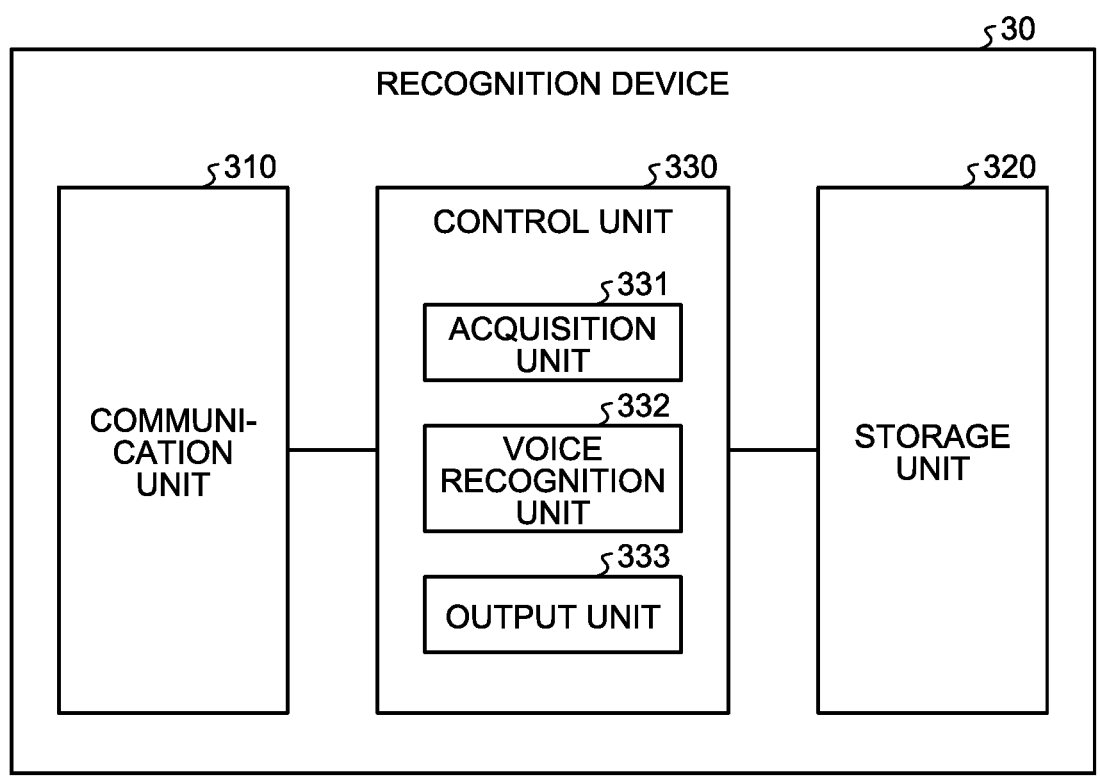
FIG. 9 is a diagram illustrating a configuration example of a recognition device according to the embodiment.

FIG. 9 is a diagram illustrating a configuration example of the recognition device according to the embodiment. With reference to FIG. 9, the following describes the configuration of the recognition device 30 according to the present embodiment.

As illustrated in FIG. 9, the recognition device 30 according to the present embodiment includes a communication unit 310, a storage unit 320, and a control unit 330. The recognition device 30 may include an input unit (for example, a mouse or a keyboard) that receives various operations from an administrator and the like utilizing the recognition device 30, or a display unit (for example, a liquid crystal display or an organic EL display) that displays various pieces of information.

Regarding Communication Unit 310

The communication unit 310 is a functional part that communicates information with the voice extraction device 20 according to the present embodiment. Specifically, for example, the communication unit 310 receives, via the network N, the observation signal that is output after the extraction processing is performed by the voice extraction device 20 on the observation signals of the voice received by the microphone array device 10. The communication unit 310 is implemented by the network I/F 1500 (for example, a network interface card (NIC)) illustrated in FIG. 13 described later.

Regarding Storage Unit 320

The storage unit 320 is a functional part that stores various pieces of information provided for processing performed by the recognition device 30. For example, the storage unit 320 stores data of the observation signal acquired by an acquisition unit 331 of the control unit 330 described later, and data of the text generated through voice recognition processing performed by a voice recognition unit 332. The storage unit 320 is implemented by at least one of the RAM 1200, the auxiliary storage device 1400 (an HDD, an SSD, or the like), and the recording medium 1900 (a DVD-RW and the like) that are illustrated in FIG. 13 described later.

Regarding Control Unit 330

The control unit 330 is a functional part that controls an operation of the entire recognition device 30. As illustrated in FIG. 9, the control unit 330 includes the acquisition unit 331, the voice recognition unit 332, and an output unit 333. The control unit 330 is implemented when the CPU 1100 illustrated in FIG. 13 described later executes a computer program stored in the ROM 1300, the auxiliary storage device 1400, and the like using the RAM 1200 as a working area.

Part or all of the functional parts described above of the control unit 330 are not necessarily implemented by a computer program as software, but may be implemented by a hardware circuit such as an FPGA or an ASIC.

Each functional part of the control unit 330 illustrated in FIG. 9 conceptually represents a function, and is not limited to the configuration as described above. For example, a plurality of functional parts illustrated in FIG. 9 as independent functional parts of the control unit 330 may be configured as one functional part. On the other hand, a function of one functional part included in the control unit 330 in FIG. 9 may be divided into a plurality of functions, and may be configured as a plurality of functional parts.

Regarding Acquisition Unit 331

The acquisition unit 331 is a functional part that acquires, via the communication unit 310, the observation signal that is output after extraction processing is performed by the voice extraction device 20 on the observation signal of the voice received by the microphone array device 10. The acquisition unit 331 transmits the acquired emphasized signal to the voice recognition unit 332.

Regarding Voice Recognition Unit 332

The voice recognition unit 332 is a functional part that performs voice recognition processing on the observation signal acquired by the acquisition unit 331, and converts the observation signal into text. Herein, the voice recognition processing may be performed by using a known algorithm such as a recognition algorithm using a deep neural network. The voice recognition unit 332 transmits the text converted from the observation signal to the output unit 333.

Regarding Output Unit 333

The output unit 333 is a functional part that outputs the text that is converted from the observation signal by the voice recognition unit 332 to an external device that utilizes the text via the communication unit 310. The text that is converted from the observation signal by the voice recognition unit 332 is not necessarily output to the outside, and may be output to an application executed in the recognition device 30.

5. Processing Procedure

Figure 10:
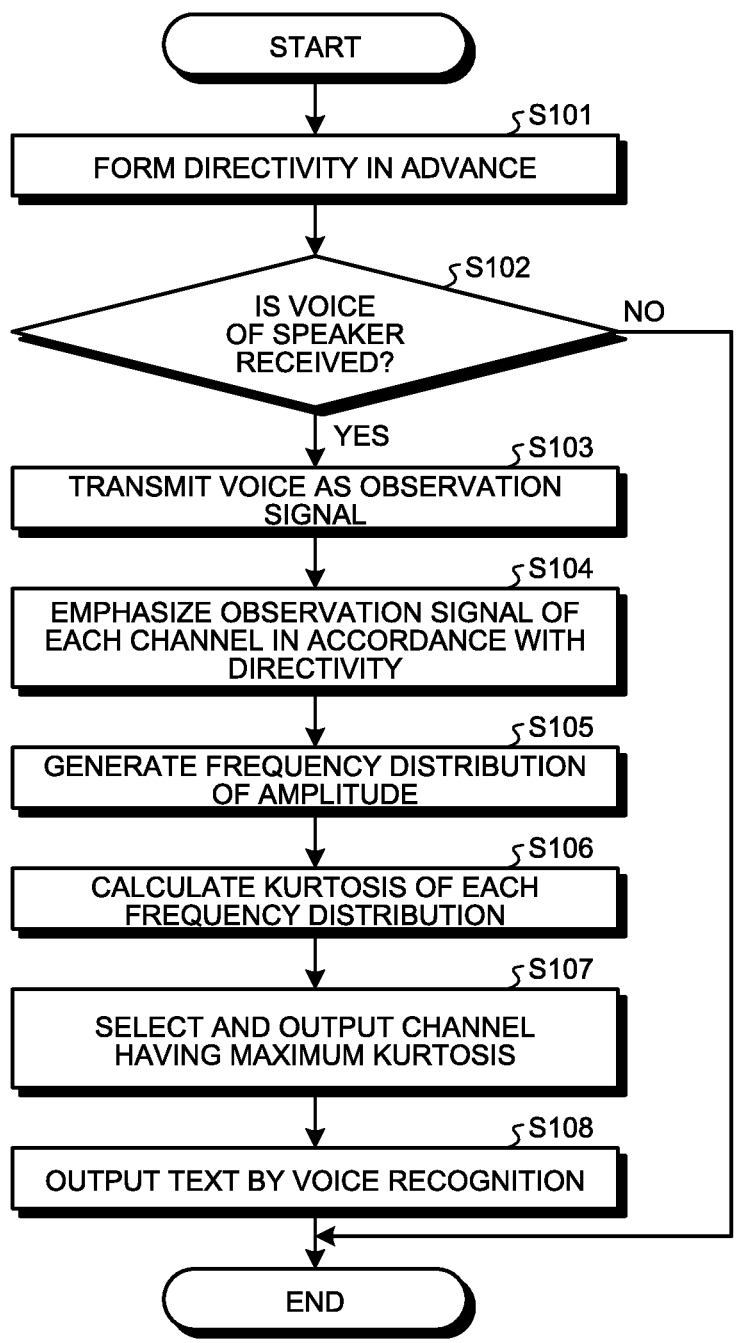
FIG. 10 is a flowchart illustrating an example of processing performed by the voice recognition system according to the embodiment.

FIG. 10 is a flowchart illustrating an example of processing performed by the voice recognition system according to the embodiment. With reference to FIG. 10, the following describes a processing procedure of the voice recognition system 1 according to the present embodiment.

Step S101

The formation unit 232 of the voice extraction device 20 forms directivity in advance so as to emphasize the voice coming from the direction facing each microphone of the microphone array device 10. The process proceeds to Step S102.

Step S102

If the microphone array device 10 receives the voice of the speaker by each microphone (Yes at Step S102), the process proceeds to Step S103. If the microphone array device 10 does not receive the voice (No at Step S102), the process is ended.

Step S103

The microphone array device 10 transmits the voice received by each microphone (each channel) to the voice extraction device 20 as the observation signal. The process proceeds to Step S104.

Step S104

The emphasis unit 233 of the voice extraction device 20 emphasizes the observation signal of each channel acquired by the acquisition unit 231 to generate the emphasized signal in accordance with the directivity formed by the formation unit 232. The process proceeds to Step S105.

Step S105

The generation unit 234 of the voice extraction device 20 generates frequency distribution of amplitude of the emphasized signal for each channel based on the emphasized signal of each channel emphasized by the emphasis unit 233. The process proceeds to Step S106.

Step S106

The calculation unit 235 of the voice extraction device 20 calculates the kurtosis of the frequency distribution of amplitude of the emphasized signal of each channel generated by the generation unit 234. At this point, the calculation unit 235 causes the calculation result storage unit 221 to store the calculated kurtosis corresponding to each channel. The process proceeds to Step S107.

Step S107

The selection unit 236 of the voice extraction device 20 selects the channel for outputting the observation signal to the recognition device 30 based on the kurtosis of each channel calculated by the calculation unit 235. Specifically, the selection unit 236 selects the channel corresponding to the maximum kurtosis among the kurtosises of the respective channels. The output unit 237 of the voice extraction device 20 outputs the observation signal corresponding to the channel selected by the selection unit 236 to the recognition device 30 via the communication unit 240. The process proceeds to Step S108.

Step S108

The acquisition unit 331 of the recognition device 30 acquires, via the communication unit 310, the observation signal that is output when the voice extraction device 20 performs extraction processing. The voice recognition unit 332 of the recognition device 30 performs voice recognition processing on the observation signal acquired by the acquisition unit 331, and converts the observation signal into text. The output unit 333 of the recognition device 30 outputs the text that is converted from the observation signal by the voice recognition unit 332 to an external device that utilizes the text via the communication unit 310. The process is then ended.

The processing of the voice recognition system 1 according to the present embodiment is performed through Steps S101 to S108 as described above. Specifically, after the directivity is formed by the formation unit 232 at Step S101, Steps S102 to S108 are repeatedly performed.

6. Modification

The voice extraction device 20 described above may be implemented not only by the embodiment described above but also by various different embodiments. The following describes another embodiment of the voice extraction device.

6-1. Output of Emphasized Signal

Figure 11:
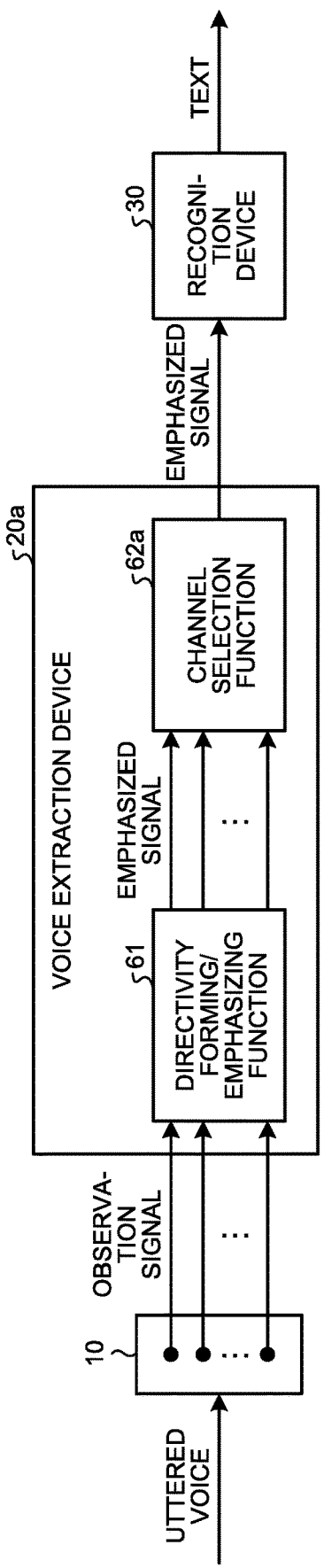
FIG. 11 is a diagram illustrating an example of extraction processing according to a modification.

FIG. 11 is a diagram illustrating an example of extraction processing according to a modification. In the embodiment described above, exemplified is a case of outputting the observation signal corresponding to the selected channel to the recognition device 30. On the other hand, the following describes processing of outputting the emphasized signal corresponding to the selected channel to the recognition device 30 with reference to FIG. 11.

A voice extraction device 20a illustrated in FIG. 11 is a device that performs extraction processing on the observation signal based on the voice received by the microphone array device 10, the extraction processing of emphasizing the observation signal of each channel in accordance with the directivity formed in advance corresponding to each microphone of the microphone array device 10, selecting the channel based on the kurtosis of the frequency distribution of amplitude of the emphasized signal, and extracting the emphasized signal corresponding to the selected channel to be output. As illustrated in FIG. 11, the voice extraction device 20a has functions, that is, the directivity forming/emphasizing function 61 and a channel selection function 62a.

The directivity forming/emphasizing function 61 is the same function as the directivity forming/emphasizing function 61 of the voice extraction device 20 illustrated in FIG. 1.

The channel selection function 62a is a function of selecting the channel based on the kurtosis of the frequency distribution of amplitude of the emphasized signal generated by the directivity forming/emphasizing function 61, and extracting the emphasized signal corresponding to the selected channel to be output.

Figure 12:
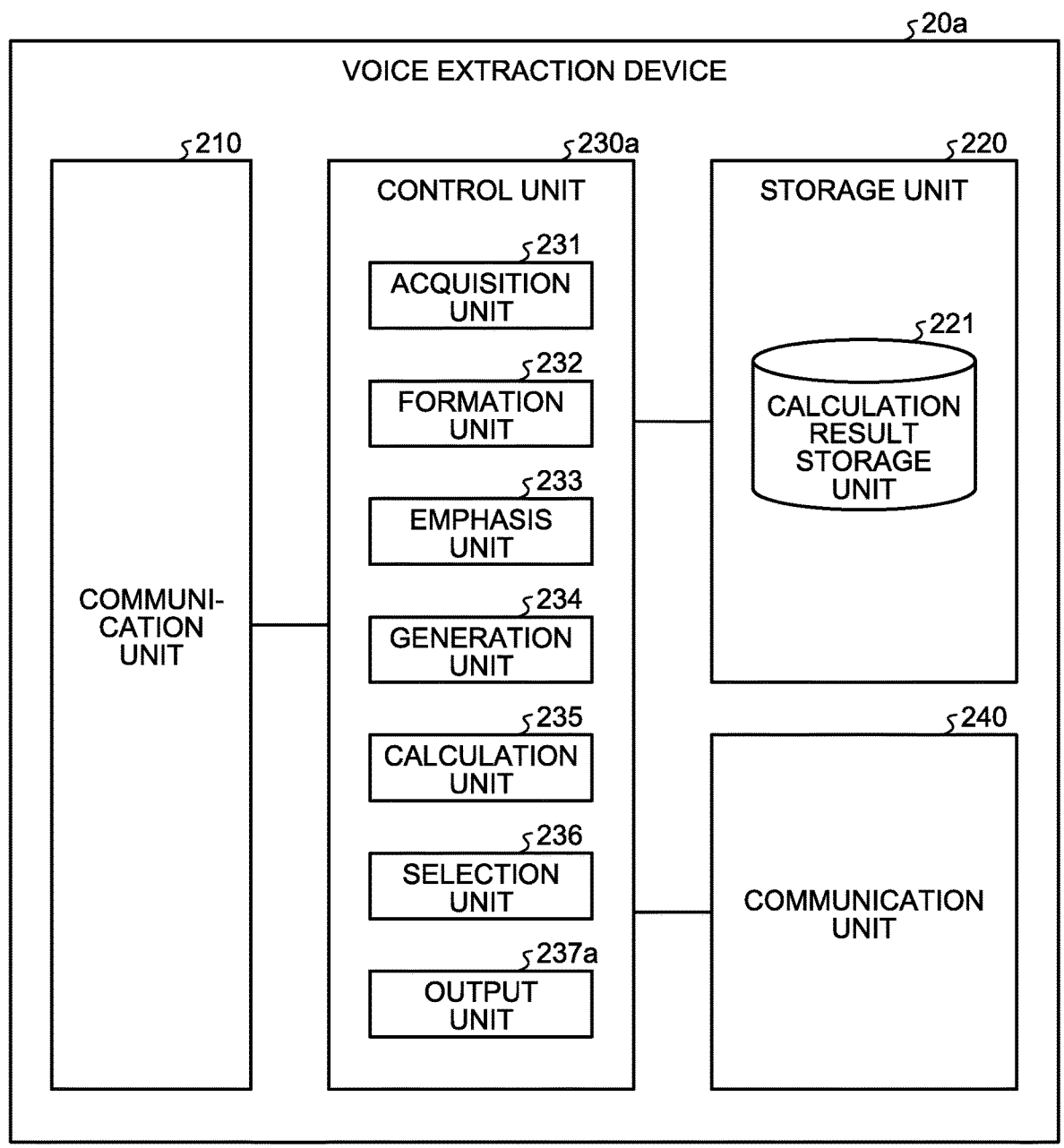
FIG. 12 is a diagram illustrating a configuration example of a voice extraction device according to the modification.

FIG. 12 is a diagram illustrating a configuration example of the voice extraction device according to the modification. With reference to FIG. 12, the following describes a configuration of the voice extraction device 20a according to the present modification.

As illustrated in FIG. 12, the voice extraction device 20a according to the present modification includes the communication unit 210, the storage unit 220, a control unit 230a, and the communication unit 240. The voice extraction device 20a may include an input unit (for example, a mouse or a keyboard) that receives various operations from an administrator and the like utilizing the voice extraction device 20a, or a display unit (for example, a liquid crystal display or an organic EL display) that displays various pieces of information. The functions of the communication unit 210, the storage unit 220, and the communication unit 240 are the same as the functions describe above with reference to FIG. 4.

The control unit 230a is a functional part that controls an operation of the entire voice extraction device 20a. As illustrated in FIG. 12, the control unit 230a includes the acquisition unit 231, the formation unit 232, the emphasis unit 233, the generation unit 234, the calculation unit 235, the selection unit 236, and an output unit 237a. The control unit 230a is implemented when the CPU 1100 illustrated in FIG. 13 described later executes a computer program stored in the ROM 1300, the auxiliary storage device 1400, and the like using the RAM 1200 as a working area. The functions of the acquisition unit 231, the formation unit 232, the emphasis unit 233, the generation unit 234, the calculation unit 235, and the selection unit 236 are the same as the functions described above with reference to FIG. 4. The functions of the formation unit 232 and the emphasis unit 233 are included in the directivity forming/emphasizing function 61 illustrated in FIG. 11 described above. The functions of the generation unit 234, the calculation unit 235, the selection unit 236, and the output unit 237a are included in the channel selection function 62a illustrated in FIG. 11 described above.

Part or all of the functional parts described above of the control unit 230a are not necessarily implemented by a computer program as software, but may be implemented by a hardware circuit such as an FPGA or an ASIC.

Each functional part of the control unit 230a illustrated in FIG. 12 conceptually represents a function, and is not limited to the configuration as described above. For example, a plurality of functional parts illustrated in FIG. 12 as independent functional parts of the control unit 230a may be configured as one functional part. On the other hand, a function of one functional part included in the control unit 230a in FIG. 12 may be divided into a plurality of functions, and may be configured as a plurality of functional parts.

The output unit 237a is a functional part that extracts the emphasized signal corresponding to the channel selected by the selection unit 236 from among the observation signals of the voice received by the microphones of the microphone array device 10, and outputs the emphasized signal to the recognition device 30 via the communication unit 240. The function of the output unit 237a is included in the channel selection function 62a illustrated in FIG. 11 described above.

As described above, the observation signal corresponding to the selected channel is output to the recognition device 30 in FIG. 4. Alternatively, as illustrated in FIG. 12 according to the present modification, the emphasized signal corresponding to the selected channel may be output. Accordingly, similarly to the voice extraction device 20 according to the embodiment described above, accuracy in voice recognition can be improved by appropriately extracting the voice to prevent the signal from being distorted.

6-2. Selection with Other Index Values Based on Frequency Distribution

In the embodiment described above, the calculation unit 235 calculates the kurtosis of the frequency distribution of amplitude of the emphasized signal of each channel generated by the generation unit 234, and the selection unit 236 selects the channel corresponding to the maximum kurtosis among the kurtosises of the respective channels calculated by the calculation unit 235. However, the embodiment is not limited thereto. For example, the channel for outputting the observation signal (or the emphasized signal) to the recognition device 30 may be selected by using the following method.

For example, the selection unit 236 may select one or more channels corresponding to respective kurtosises equal to or larger than a predetermined threshold among the calculated kurtosises of the respective channels, and the output unit 237 (237a) may average or synthesize the observation signals (or the emphasized signals) corresponding to the selected one or more channels to be output to the recognition device 30. In this case, an upper limit may be set to the number of channels selected by the selection unit 236.

For example, the calculation unit 235 may calculate a different index value instead of the kurtosis as an index value from the generated frequency distribution of amplitude of the emphasized signal of each channel. For example, the calculation unit 235 may calculate an index value such as a frequent value of the frequency distribution, variance, an average value, height of the peak portion and the bottom portion of the frequency distribution, width of the graph at a predetermined position from the peak portion of the frequency distribution, or a mode of the frequency distribution. In this case, the selection unit 236 may select the channel for outputting the observation signal (or the emphasized signal) based on the calculated index value.

For example, a model (pattern) of the frequency distribution of amplitude of a voice signal of a person (speaker) may be prepared in advance, and the calculation unit 235 may compare the generated frequency distribution of amplitude of the emphasized signal of each channel with the model to calculate similarity therebetween as the index value. In this case, for example, the selection unit 236 may select the channel corresponding to the emphasized signal having the highest similarity to the model of the frequency distribution.

In this way, based on the frequency distribution of amplitude of the emphasized signal, even with the methods described above, accuracy in voice recognition can be improved by appropriately extracting the voice to prevent the signal from being distorted similarly to the voice extraction device 20 according to the embodiment described above.

7. Hardware Configuration

FIG. 13 is a diagram illustrating an example of a hardware configuration of a computer that implements the function of the voice extraction device. The voice extraction device 20 and the recognition device 30 according to the embodiment described above are implemented by a computer 1000 having the configuration illustrated in FIG. 13, for example. The following exemplifies the voice extraction device 20.

The computer 1000 includes the CPU 1100, the RAM 1200, the ROM 1300, the auxiliary storage device 1400, the network interface (I/F) 1500, the communication interface (I/F) 1600, an input/output interface (I/F) 1700, and a media interface (I/F) 1800. The CPU 1100, the RAM 1200, the ROM 1300, the auxiliary storage device 1400, the network I/F 1500, the communication I/F 1600, the input/output I/F 1700, and the media I/F 1800 are connected to each other to be able to perform data communication via a bus 1950.

The CPU 1100 is an arithmetic device that operates based on a computer program stored in the ROM 1300 or the auxiliary storage device 1400, and controls various units. The ROM 1300 is a non-volatile storage device that stores a Basic Input/Output System (BIOS) and a boot program executed by the CPU 1100 at the time of activation of the computer 1000, a computer program depending on hardware of the computer 1000, and the like.

The auxiliary storage device 1400 is a non-volatile storage device that stores a computer program executed by the CPU 1100, data used by the computer program, and the like. The auxiliary storage device 1400 is, for example, an HDD or an SSD.

The network I/F 1500 is a communication interface that receives data from another appliance via a communication network 600 (corresponding to the network N illustrated in FIG. 3) to be transmitted to the CPU 1100, and transmits data generated by the CPU 1100 to another appliance via the communication network 600. The network I/F 1500 is, for example, an NIC.

The communication I/F 1600 is a communication interface for communicating data with peripheral equipment. The communication I/F 1600 is, for example, a USB interface or a serial port.

The CPU 1100 controls an output device such as a display or a printer, and an input device such as a keyboard or a mouse via the input/output I/F 1700. The CPU 1100 acquires data from the input device via the input/output I/F 1700. The CPU 1100 outputs the generated data to the output device via the input/output I/F 1700.

The media I/F 1800 is an interface that reads a computer program or data stored in the recording medium 1900, and provides the computer program or data to the CPU 1100 via the RAM 1200. The CPU 1100 loads the provided computer program into the RAM 1200 from the recording medium 1900 via the media I/F 1800, and executes the loaded computer program. The recording medium 1900 is, for example, a digital versatile disc (DVD), an optical recording medium such as a phase change rewritable disk (PD), a magneto-optical recording medium such as a magneto-optical disk (MO), a tape medium, a magnetic recording medium, or a semiconductor memory.

For example, when the computer 1000 functions as the voice extraction device 20 according to the embodiment, the CPU 1100 of the computer 1000 executes the computer program loaded into the RAM 1200 to implement the function of the control unit 230. The data in the storage unit 220 is stored in the auxiliary storage device 1400. The CPU 1100 of the computer 1000 reads and executes these computer programs from the recording medium 1900, but the CPU 1100 may acquire these computer programs from another device via the communication network 600 as another example.

The hardware configuration of the computer 1000 illustrated in FIG. 13 is merely an example, does not necessarily include the components illustrated in FIG. 13, and may include other components.

8. Others

Among the pieces of processing described in the above embodiment, all or part of the pieces of processing described to be automatically performed may be manually performed, or all or part of the pieces of processing described to be manually performed may be automatically performed using a known method. Information including the processing procedure, a specific name, various pieces of data, and a parameter described in the above description and the drawings can be optionally changed unless otherwise specifically noted. For example, various pieces of information illustrated in the drawings are not limited to the illustrated information.

The components of the devices illustrated in the drawings are merely conceptual, and it is not required that it is physically configured as illustrated necessarily. That is, specific forms of distribution and integration of the devices are not limited to those illustrated in the drawings. All or part thereof may be functionally or physically distributed/integrated in arbitrary units depending on various loads or usage states. For example, the generation unit 234 and the calculation unit 235 illustrated in FIG. 4 may be integrated with each other. For example, information stored in the storage unit 220 may be stored, via the network N, in a predetermined storage device that is externally provided.

In the embodiment described above, exemplified is a case in which the voice extraction device 20 performs, for example, emphasis processing of emphasizing the observation signal of each channel to generate the emphasized signal in accordance with the directivity, and generation processing of generating the frequency distribution of amplitude of the emphasized signal for each channel based on the emphasized signal of each channel. However, the voice extraction device 20 described above may be separated into an emphasizing device that performs emphasis processing and a generating device that performs generation processing. In this case, the emphasizing device includes at least the emphasis unit 233. The generating device includes at least the generation unit 234. The processing performed by the voice extraction device 20 described above is implemented by the voice recognition system 1 including the emphasizing device and the generating device.

The embodiments and the modification thereof described above can be appropriately combined without contradiction in processing content.

9. Effect

As described above, the voice extraction device 20 (20a) according to the embodiment includes the formation unit 232, the acquisition unit 231, the emphasis unit 233, the generation unit 234, and the selection unit 236. In the microphone array device 10 in which a plurality of channels are formed by including a plurality of microphones, the formation unit 232 forms directivity in advance through beam-forming processing for each microphone. The acquisition unit 231 acquires the observation signal that is a signal of the voice received in each channel. The emphasis unit 233 emphasizes the observation signal of each channel to generate the emphasized signal in accordance with the directivity for each microphone formed by the formation unit 232. The generation unit 234 generates, for each channel, the frequency distribution of amplitude of the emphasized signal generated by the emphasis unit 233. The selection unit 236 selects the channel corresponding to the voice signal used for voice recognition from among the channels based on the frequency distribution corresponding to the respective channels generated by the generation unit 234.

In this way, the directivity is not necessarily formed every time the observation signal is received, and the channel is selected based on the frequency distribution of amplitude generated with the emphasized signal of each channel emphasized based on the formed directivity without performing sound source localization of the voice recognition system in the related art. This channel selection corresponds to the function of sound source localization of the voice recognition system in the related art, but it is not necessary to perform sound source localization processing the calculation load of which is high. Accordingly, a load of arithmetic processing can be reduced, and the signal can be prevented from being distorted by appropriately extracting the voice, so that accuracy in voice recognition can be improved.

The voice extraction device 20 (20a) according to the embodiment further includes the output unit 237 (237a). The output unit 237 (237a) outputs, to the recognition device 30 that performs voice recognition, the voice signal corresponding to the channel selected by the selection unit 236 among the channels of the microphone array device 10.

In this way, the voice extraction device 20 (20a) according to the embodiment appropriately extracts the voice in which the signal is prevented from being distorted, and outputs the voice signal corresponding to the voice, so that accuracy in voice recognition of the recognition device 30 can be improved.

The selection unit 236 selects the channel corresponding to the observation signal serving as the voice signal used for voice recognition from among the channels based on the frequency distribution corresponding to the respective channels generated by the generation unit 234. The output unit 237 outputs, to the recognition device 30, the observation signal corresponding to the channel selected by the selection unit 236.

In this way, the voice extraction device 20 according to the embodiment may output the observation signal as the voice signal used for voice recognition performed by the recognition device 30. Due to this, even when a failure occurs in beam-forming processing performed by the formation unit 232 and emphasis processing of the observation signal performed by the emphasis unit 233, and the emphasized signal is distorted, accuracy in voice recognition can be improved by outputting the observation signal that is not distorted as it is.

The selection unit 236 selects the channel corresponding to the emphasized signal serving as the voice signal used for voice recognition from among the channels based on the frequency distribution corresponding to the respective channels generated by the generation unit 234. The output unit 237a outputs, to the recognition device 30, the emphasized signal corresponding to the channel selected by the selection unit 236.

In this way, the voice extraction device 20a according to the modification of the embodiment may output the emphasized signal as the voice signal used for voice recognition performed by the recognition device 30. Due to this, accuracy in voice recognition can be improved by outputting the emphasized signal that is an emphasized voice signal corresponding to the channel that is appropriately selected.

The voice extraction device 20 (20a) according to the embodiment further includes the calculation unit 235. The calculation unit 235 calculates the index value for the frequency distribution corresponding to each channel generated by the generation unit 234. The selection unit 236 selects the channel corresponding to the voice signal used for voice recognition from among the channels based on the index value calculated by the calculation unit 235.

In this way, the voice extraction device 20 (20a) according to the embodiment may use the index value for the frequency distribution calculated by the calculation unit 235 to select the channel corresponding to the voice signal used for voice recognition. Due to this, the channel can be selected based on the index value appropriately indicating a characteristic of the frequency distribution, so that the voice can be appropriately extracted, and the signal can be prevented from being distorted. Accordingly, accuracy in voice recognition can be improved.

The calculation unit 235 calculates, as the index value, the kurtosis of the frequency distribution corresponding to each channel. The selection unit 236 selects the channel corresponding to the voice signal used for voice recognition from among the channels based on the kurtosis calculated by the calculation unit 235.

In this way, the voice extraction device 20 (20a) according to the embodiment may use the kurtosis of the frequency distribution calculated by the calculation unit 235 to select the channel corresponding to the voice signal used for voice recognition. Due to this, the channel can be selected based on the kurtosis appropriately indicating a characteristic of the frequency distribution, so that the voice can be appropriately extracted, and the signal can be prevented from being distorted. Accordingly, accuracy in voice recognition can be improved.

The selection unit 236 selects the channel corresponding to the maximum kurtosis among kurtosises corresponding to the respective channels calculated by the calculation unit 235.

Due to this, the channel corresponding to the emphasized signal that is clearly emphasized from the observation signal can be selected, so that the voice can be appropriately extracted, and the signal can be prevented from being distorted. Accordingly, accuracy in voice recognition can be improved.

The calculation unit 235 calculates, for each channel, similarity between the frequency distribution corresponding to each channel and a predetermined model of the frequency distribution of amplitude of the voice signal. The selection unit 236 selects the channel corresponding to the maximum similarity among similarities corresponding to the respective channels calculated by the calculation unit 235.

In this way, to select the channel corresponding to the voice signal used for voice recognition, the voice extraction device 20 (20a) according to the embodiment may use the similarity between the frequency distribution corresponding to each channel and the predetermined model of the frequency distribution of amplitude of the voice signal calculated by the calculation unit 235. Due to this, the channel corresponding to the emphasized signal determined to be closer to the voice signal of the model can be selected, so that the voice can be appropriately extracted, and the signal can be prevented from being distorted. Accordingly, accuracy in voice recognition can be improved.

EXAMPLE

FIG. 14 is a diagram illustrating an example of a verification result of correct character accuracy in each system. With reference to FIG. 14, described is an example of the verification result of correct character accuracy in the recognition device 30 in a case of using the voice extraction device 20 according to the embodiment described above illustrated in FIG. 1 and FIG. 4, and in a case of using the voice extraction device 20a according to the modification described above illustrated in FIG. 11 and FIG. 12. In this example, verification is conducted under the following verification condition.

The number of elements (microphones) of the microphone array device: 8

The shape of the microphone array: circular shape, radius of 3.7 cm

Voice used for learning the voice recognition model: voice to which noise or reverberation is added Evaluation data: command utterance recorded in a real environment: 9900 utterances Four rooms, combinations of positions of the microphone and the speaker are six.

Specifically, comparison of correct character accuracy was made with the systems described in the following <1> to <5>.

<1> Channel_Select (enh)

This is a voice recognition system using the voice extraction device 20a according to the modification described above, and uses a DS method as beam-forming processing.

<2> Channel_Select (obs)

This is a voice recognition system using the voice extraction device 20 according to the embodiment described above, and uses the DS method as beam-forming processing.

<3> Static

This is a system that receives sound using only one microphone positioned in front of the speaker among the microphones of the microphone array device.

<4> BeamformIt

This is the voice recognition system in the related art illustrated in FIG. 2, uses the GCC-PHAT for sound source localization, and uses the DS method for beam-forming processing. In performing sound source localization, a Viterbi algorithm is further applied to the result of GCC-PHAT.

<5> BeamformIt (channel_select)

This is a voice recognition system using the observation signal in the selected channel as a signal in BeamformIt.

As illustrated in FIG. 14 as the result of correct character accuracy, it is found that performance of BeamformIt and BeamformIt (channel_select) as the voice recognition system in the related art is deteriorated as compared with Static. This may be because sound source localization is difficult under a noise and reverberation environment, and beam-forming processing is unsuccessfully performed.

On the other hand, it is found that recognition performance of channel_select (obs) as the voice recognition system according to the embodiment described above is improved as compared with Static. Accordingly, it is considered that the channel effective for voice recognition can be selected by channel_select (obs). It was found that channel_select(enh) as the voice recognition system according to the modification described above exhibits the highest performance in the present verification. It can be considered that, through the channel selection with the kurtosis, performance of the selection is improved as compared with the voice recognition system in the related art, and the effect of forming the directivity in advance through beam-forming processing is exhibited.

FIG. 15 is a diagram illustrating an example of a result of processing time of extraction processing for processing time of each system. With reference to FIG. 15, the following describes a comparison result of calculation time between the processing performed by the system (channel_select (obs) described above) in a case of using the voice extraction device 20 according to the embodiment described above illustrated in FIG. 1 and FIG. 4, and the processing performed by the voice recognition system (BeamformIt described above) in the related art. In this example, comparison of calculation time is made under the following condition.

Machine spec: Intel (R) Xeon (R) CPU E5-2630L 0@ 2.00 GHz

Measurement method: Measured by a time command of Linux (registered trademark), and user time Calculate average and standard deviation at the time when 4980 utterances are processed As illustrated in FIG. 15 as the comparison result of calculation time, it was found that the calculation time is significantly reduced in the voice recognition system according to the present embodiment as compared with that in the voice recognition system in the related art.

According to an aspect of the embodiment, the voice can be appropriately extracted, and accuracy in voice recognition can be improved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A voice extraction device comprising:
a processor programmed to:
form directivity in advance through beam-forming processing for each microphone in a microphone array including a plurality of microphones, each microphone corresponding to one of a plurality of channels;
acquire an observation signal for each channel that is a signal of voice received by the channel;
generate an emphasized signal for each observation signal by increasing the observation signal by an amount corresponding to the directivity of the microphone corresponding to the channel for the observation signal;
generate, for each of the channels, frequency distribution of amplitude of the generated emphasized signal;
calculate, for each of the channels, a similarity between the frequency distribution corresponding to the channel and a predetermined model of frequency distribution of amplitude of a voice signal; and
select a channel corresponding to the maximum similarity among calculated similarities corresponding to the respective channels.

2. The voice extraction device according to claim 1, wherein the processor is programmed to output, to a recognition device for performing voice recognition, a voice signal corresponding to the selected channel from among the channels of the microphone array.

3. The voice extraction device according to claim 2, wherein the processor is programmed to:
select a channel corresponding to the observation signal serving as the voice signal used for voice recognition from among the channels based on the generated frequency distribution corresponding to the respective channels; and
output, to the recognition device, the observation signal corresponding to the selected channel.

4. The voice extraction device according to claim 2, wherein the processor is programmed to:
select a channel corresponding to the emphasized signal serving as the voice signal used for voice recognition from among the channels based on the generated frequency distribution corresponding to the respective channels; and
output, to the recognition device, the emphasized signal corresponding to the selected channel.

5. The voice extraction device according to claim 1, wherein the processor is programmed to:
calculate an index value for the generated frequency distribution corresponding to the respective channels; and
select a channel corresponding to a voice signal used for voice recognition from among the channels based on the calculated index value.

6. The voice extraction device according to claim 5, wherein the processor is programmed to:
calculate a kurtosis of the frequency distribution corresponding to the respective channels as the index value; and
select a channel corresponding to a voice signal used for voice recognition from among the channels based on the calculated kurtosis.

7. The voice extraction device according to claim 6, wherein the processor is programmed to select a channel corresponding to the maximum kurtosis among the calculated kurtosises corresponding to the respective channels.

8. A voice extraction method that is a calculation method executed by a computer, the method comprising:
forming directivity in advance through beam-forming processing for each microphone in a microphone array including a plurality of microphones, each microphone corresponding to one of a plurality of channels;
acquiring an observation signal that is a signal for each channel that is a signal of voice received by the channel;
generating an emphasized signal for each observation signal by increasing the observation signal by an amount corresponding to the directivity of the microphone corresponding to the channel for the observation signal;
generating, for each of the channels, frequency distribution of amplitude of the generated emphasized signal;
calculating, for each of the channels, a similarity between the frequency distribution corresponding to the channel and a predetermined model of frequency distribution of amplitude of a voice signal; and
selecting a channel corresponding to the maximum similarity among calculated similarities corresponding to the respective channels.

9. A non-transitory computer-readable recording medium having stored a voice extraction program that causes a computer to execute functions comprising:
forming directivity in advance through beam-forming processing for each microphone in a microphone array including a plurality of microphones, each microphone corresponding to one of a plurality of channels;
acquiring an observation signal that is a signal for each channel that is a signal of voice received by the channel;
generating an emphasized signal for each observation signal by increasing the observation signal by an amount corresponding to the directivity of the microphone corresponding to the channel for the observation signal;
generating, for each of the channels, frequency distribution of amplitude of the generated emphasized signal;
calculating, for each of the channels, a similarity between the frequency distribution corresponding to the channel and a predetermined model of frequency distribution of amplitude of a voice signal; and
selecting a channel corresponding to the maximum similarity among calculated similarities corresponding to the respective channels.

* * * * *